US012798491B2

(12) United States Patent
Hirschmann

(10) Patent No.: US 12,798,491 B2
(45) Date of Patent: Nov. 17, 2026

(54) ARTICULATING RECREATIONAL VEHICLE RACK

(71) Applicant: Thomas Michael Hirschmann, Evergreen, CO (US)

(72) Inventor: Thomas Michael Hirschmann, Evergreen, CO (US)

( * ) Notice: Subject to any disclaimer, the term of this patent is extended or adjusted under 35 U.S.C. 154(b) by 0 days.

(21) Appl. No.: 19/254,306

(22) Filed: Jun. 30, 2025

(65) Prior Publication Data

US 2026/0054657 A1 Feb. 26, 2026

Related U.S. Application Data

(60) Provisional application No. 63/686,601, filed on Aug. 23, 2024.

(51) Int. Cl.
*B60R 9/06* (2006.01)
*B60P 1/02* (2006.01)
(Continued)

(52) U.S. Cl.
CPC ................ *B60R 9/065* (2013.01); *B60P 1/02* (2013.01); *B60R 16/033* (2013.01); *F15B 15/26* (2013.01); *B60Q 1/307* (2013.01); *F16F 9/50* (2013.01); *F16F 2222/126* (2013.01); *F16F 2228/066* (2013.01); *F16F 2228/14* (2013.01)

(58) Field of Classification Search
CPC . B60R 2011/008; B60R 16/03; B60R 16/033; B60R 9/06; B60R 9/10; B60R 9/055; B60R 9/065; B60P 1/022; B60P 1/02; B60P 1/483; B60P 1/4492; B60P 1/4485; B60P 1/4414; F15B 15/26; B60Q 1/307; F16F 9/50; F16F 2222/126; F16F 2228/066; F16F 2228/14; B62D 33/0276; B62D 33/03; B62D 43/02
See application file for complete search history.

(56) References Cited

U.S. PATENT DOCUMENTS 4,241,858 A * 12/1980 Lawroski ................ B60R 9/065 224/532
4,785,980 A * 11/1988 Redick ...................... B60R 9/12 224/511

(Continued)

FOREIGN PATENT DOCUMENTS

| | | | |
|---|---|---|---|
| CN | 109661328 | A | 4/2019 |
| CN | 113212313 | A | 8/2021 |
| DE | 19944953 | A1 | 3/2001 |

*Primary Examiner* — Glenn F Myers
(74) *Attorney, Agent, or Firm* — Whiteford, Taylor & Preston LLP; Jeffrey Schell

(57) ABSTRACT

The invention relates to an articulating storage and transportation system for recreational vehicles, comprising a rack mounted on a cargo box attached to a rear door. The system features a parallelogram mechanism with linear actuators, allowing the rack to lower while maintaining a parallel orientation to the cargo box surface. This design improves accessibility for loading and unloading equipment, particularly bicycles. The rack can rest on the opposite door's tire for added stability and incorporates modular attachments for versatility. Additional features include a locking mechanism, guiding system, and potential integration of powered accessories, enhancing functionality and user experience for RV enthusiasts.

11 Claims, 6 Drawing Sheets

(51) Int. Cl.

| | |
|---|---|
| ***B60R 16/033*** | (2006.01) |
| ***F15B 15/26*** | (2006.01) |
| *B60Q 1/30* | (2006.01) |
| *F16F 9/50* | (2006.01) |

(56) References Cited

U.S. PATENT DOCUMENTS

| | | | | |
|---|---|---|---|---|
| 5,456,564 | A * | 10/1995 | Bianchini | B60R 9/06<br>224/508 |
| 5,988,470 | A | 11/1999 | Siciliano | |
| 9,096,160 | B2 * | 8/2015 | Le Anna | B60R 9/06 |
| 9,555,744 | B1 | 1/2017 | Roth | |
| 10,384,618 | B2 | 8/2019 | Williams | |
| 11,059,428 | B1 | 7/2021 | Weil | |
| 11,325,540 | B2 | 5/2022 | Gaddis | |
| 11,772,570 | B2 | 10/2023 | Weng | |
| 2001/0001636 | A1 * | 5/2001 | Klinkenberg | B60P 1/4414<br>414/462 |
| 2010/0213228 | A1 | 8/2010 | Dannewitz | |
| 2017/0349111 | A1 | 12/2017 | Ramsdell et al. | |
| 2018/0009360 | A1 * | 1/2018 | Christian | B66F 7/28 |
| 2019/0039532 | A1 * | 2/2019 | Peter | B60R 3/02 |
| 2020/0086801 | A1 | 3/2020 | Anton | |
| 2021/0031665 | A1 * | 2/2021 | Niemela | A01K 5/0107 |
| 2022/0153204 | A1 | 5/2022 | Oshman | |
| 2023/0091144 | A1 | 3/2023 | Heacock | |
| 2023/0255840 | A1 * | 8/2023 | Dupuy | A61G 3/067<br>414/495 |
| 2023/0356665 | A1 | 11/2023 | Huang | |
| 2024/0270177 | A1 * | 8/2024 | Zhou | B60R 9/065 |
| 2024/0278729 | A1 * | 8/2024 | Rowley | B60R 11/06 |
| 2025/0074323 | A1 * | 3/2025 | Schroeder | B60R 9/06 |

* cited by examiner

ARTICULATING RECREATIONAL VEHICLE RACK

CROSS REFERENCE TO RELATED APPLICATIONS

This application claims the benefit of and priority to U.S. Provisional Application No. 63/686,601, filed on Aug. 23, 2024, entitled "ARTICULATING RECREATIONAL VEHICLE RACK," the entire disclosure of which is hereby incorporated by reference in its entirety.

FIELD OF THE INVENTION

The present invention relates to storage and transportation systems for recreational vehicles (RVs) and van conversions, specifically focusing on an articulating bike rack and cargo storage solution for rear-mounted installation on van-style RVs, and also cargo solutions on overland vehicles, overland trailers and truck bed overland accessories. This field encompasses bicycle transportation systems, cargo storage solutions, and articulating mechanisms designed to improve accessibility, safety, and efficiency in vehicle storage systems for outdoor equipment and recreational items. The invention addresses the unique challenges faced by RV and van conversion enthusiasts in safely and efficiently transporting bicycles and other gear while maximizing storage capacity and accessibility. The solution also generally relates to assists with lowering heavy equipment from overhead storage.

BACKGROUND OF THE INVENTION

Recreational vehicles (RVs) and van conversions have become increasingly popular for travelers seeking adventure and flexibility. This trend has been driven by the desire for more personalized and independent travel experiences, allowing individuals to explore diverse locations while maintaining the comforts of home. However, these vehicles often encounter significant challenges related to storage, accessibility, and functionality, particularly when it comes to transporting bicycles and other outdoor equipment.

One significant problem in the RV industry is the limited accessibility of storage areas, especially for elderly travelers or those with physical limitations. The need for efficient and accessible storage solutions in RVs and van conversions remains evident. As travelers embark on longer trips and engage in various outdoor activities, they require ample space to store their gear without compromising interior spaces and living areas. In one specific example, the transportation of bicycles presents a unique challenge due to their size and shape. Traditional storage methods often fall short in providing a balance between space efficiency and ease of access.

Accessibility is another critical concern for RV and van conversion enthusiasts. Many users, especially elderly travelers or those with physical limitations, struggle with loading and unloading bicycles and other equipment from conventional storage systems. This difficulty is exacerbated after long days of cycling or outdoor activities when fatigue sets in, potentially discouraging users from fully enjoying their adventures. After a long day of cycling, loading and unloading bikes can be particularly challenging due to muscle fatigue or potential injuries sustained during rides. This difficulty in accessing storage areas can significantly impact the overall travel experience and potentially discourage outdoor activities.

Furthermore, the functionality of storage solutions in these vehicles is often limited. There is a growing demand for versatile systems that can accommodate not only bicycles but also various other outdoor equipment such as generators, extra fuel, or water containers. This need for adaptability highlights the importance of developing innovative storage solutions that can enhance the overall travel experience while addressing the unique challenges faced by RV and van conversion users.

Space efficiency remains a concern for RV owners and van conversion enthusiasts, as the limited interior space of these vehicles must serve multiple purposes, including living, sleeping, and storage areas. Traditional storage solutions often present a challenging trade-off, requiring owners to sacrifice valuable interior living space to accommodate gear and equipment. This compromise can significantly impact the comfort and livability of the vehicle, potentially diminishing the overall travel experience. Alternatively, many RV owners resort to roof-mounted storage options, which come with their own set of drawbacks. Roof-mounted systems can be inconvenient to access, often requiring users to climb ladders or stretch to reach their equipment. This can be particularly problematic for elderly travelers or those with physical limitations, potentially discouraging them from bringing along essential outdoor gear. Moreover, roof-mounted storage solutions can negatively affect the vehicle's aerodynamics, leading to increased fuel consumption and potentially impacting the vehicle's handling characteristics, especially in windy conditions.

Roof-mounted solutions can also result in the soiling of any items placed thereon, as such solutions are typically directly exposed to the undesirable elements such as grime, salt and other contaminants encountered during road travel. Protection of bicycles and other equipment from road debris, tree branches, and other obstacles while driving is an ongoing concern. Existing rack designs may leave bikes exposed to potential damage or increase the overall width of the vehicle, making navigation through tight spaces more challenging. Thus a mechanism that affords improved protection of any items carried upon remains desirable.

Stability and safety concerns are indeed significant issues with existing bike rack designs, particularly during the critical processes of loading and unloading equipment. The potential for items to slide off or become unstable during these operations presents real and serious hazards not only to the users themselves but also to their valuable equipment. These concerns are exacerbated in the context of recreational vehicles (RVs) and van conversions, where the bike racks are often mounted at considerable heights. The elevated position of many traditional rack designs increases the risk of accidents, as users must lift heavy bicycles to chest or shoulder height, potentially losing control or balance in the process. Furthermore, the stability of the load during transit is a constant worry for travelers, especially when navigating rough terrain or encountering unexpected road conditions. Existing rack designs may not adequately secure the bicycles or other equipment, leading to potential damage or loss while driving. The need for a more stable and secure bike rack system is evident, particularly one that addresses the challenges of loading and unloading at various heights. An unmet need remains in association with maintaining the stability of the bikes throughout the entire process, from ground level to the fully stored position, while also ensuring that the equipment remains securely fastened during travel.

The versatility of storage solutions for recreational vehicles (RVs) and van conversions is often severely limited, with many systems designed for specific purposes or tailored to particular vehicle types. This lack of adaptability can be incredibly frustrating for RV owners who require the flexibility to transport a diverse array of items beyond just bicycles upon an already-mounted rack. RV enthusiasts frequently need to carry equipment such as generators, extra fuel, or water containers, which may not fit conventional storage systems designed primarily for bicycles. This limitation forces travelers to make difficult choices about what gear to bring along, potentially compromising their travel experiences or outdoor activities.

Moreover, there is a growing demand for storage solutions that can accommodate powered devices essential for comfortable and convenient travel. RV owners increasingly seek to bring along items such as air compressors for tire inflation, coolers for food and beverage storage, auxiliary lighting for improved visibility and ambiance, camp kitchens with induction heating sources for cooking, and even exterior-mounted hot water units for showers. These powered accessories enhance the overall RV experience but present additional challenges in terms of storage and power supply. The need for a more versatile and adaptable storage system is evident. As RV technology advances, there is a growing demand for "smart" storage solutions that can integrate with other vehicle systems and accommodate power-dependent accessories. However, adding such features often requires extensive modifications to the vehicle, taking up valuable space under the hood and necessitating professional installation. There remains an unmet need to not only provide space for bicycles and traditional camping gear but also incorporate features to support these powered devices. More specifically, there remains an unmet need for modular accessories and power-dependent features without requiring extensive modifications to the vehicle or taking up valuable space under the hood. There further remains a relevant need to enable the use of various powered accessories without compromising the vehicle's existing electrical system or requiring extensive modification of the vehicle to accommodate. There additionally remains need for versatility while also future-proofing RV storage solutions to accommodate the evolving technology and comfort demands of modern travelers, allowing owners to customize their travel experiences without sacrificing space efficiency or convenience.

Recreational vehicles with two swinging rear doors present unique challenges for mounting full vehicle width racks and storage solutions. The split door design inherently creates a gap in the center of the vehicle's rear, making it difficult to securely attach traditional full-width racks or storage systems. This limitation often forces RV owners to compromise on storage capacity or resort to less efficient solutions that may not fully utilize the available space. Additionally, the swinging nature of the doors means that any attached storage system must be designed to accommodate the door's movement without compromising its functionality or the vehicle's accessibility. These challenges often result in suboptimal storage solutions that may be less secure, less accessible, or less efficient in terms of space utilization, highlighting the need for innovative approaches specifically tailored to the unique constraints of dual rear door recreational vehicles. Furthermore, the dual-door configuration introduces complexities in weight distribution and stability. When attaching storage systems or racks to only one of the rear doors, there is a risk of uneven weight distribution, potentially affecting the vehicle's handling and stability during travel. This imbalance can be particularly problematic when carrying heavy items such as bicycles or generators.

Weight management is a significant challenge in the realm of recreational vehicle (RV) storage solutions generally, particularly when it comes to handling heavy equipment such as bicycles and electronically powered devices, particularly those comprising batteries. The physical exertion required to lift and secure these items at height can be substantial, often necessitating considerable strength and coordination. The need for a storage solution that addresses these weight management concerns is evident, as it would not only enhance the overall travel experience but also promote safety and accessibility for all RV enthusiasts, regardless of their physical capabilities.

The ergonomics of loading and unloading equipment, particularly bicycles, remains a significant challenge in the realm of recreational vehicle (RV) storage solutions. Many existing systems require users to lift bikes to chest or shoulder height, which can be physically demanding and potentially hazardous, especially for individuals with limited strength or mobility. This challenge is further exacerbated after strenuous rides when users are already fatigued, potentially discouraging them from fully enjoying their outdoor adventures. The difficulty in accessing and manipulating heavy equipment at elevated heights not only poses a risk of injury but also may limit the overall usability and appeal of RV storage systems for a significant portion of travelers. There is a clear need for innovative solutions that address these ergonomic concerns, potentially by allowing users to load and unload bicycles and other equipment from a lower, more manageable height. Such improvements could significantly enhance the accessibility and safety of RV storage systems, making them more user-friendly for a broader range of enthusiasts, regardless of their physical capabilities or energy levels after outdoor activities.

These and other problems collectively highlight the need for innovative storage solutions in the RV industry that address accessibility, safety, versatility, and user comfort while maximizing space efficiency and protecting valuable equipment. The need for innovative storage solutions that maximize space efficiency without compromising interior comfort or exterior design is evident in the RV industry. Ideally, such solutions would utilize often-overlooked spaces on the vehicle, such as the rear doors, to provide additional storage capacity without encroaching on living areas or adversely affecting the vehicle's performance. By addressing this critical issue, RV owners could enjoy the flexibility to bring along more outdoor equipment, enhancing their travel experiences without sacrificing the comfort and functionality of their mobile living spaces.

SUMMARY OF THE INVENTION

The invention relates to an innovative storage and transportation system for recreational vehicles (RVs) and van conversions, specifically designed to address the challenges of storing and accessing bicycles and other equipment. The system comprises a versatile rack mounted on a cargo box attached to one of the rear swinging doors of a van-style RV. A key feature of the invention is its improved accessibility, achieved through an articulating mechanism that allows the rack to lower down, making it easier for users to load and unload bikes or other items. The system maximizes storage capacity without encroaching on interior living space by utilizing the rear doors and cargo box, with the system's design in various embodiments comprising pre-installed rack mechanism in a purpose-built cargo box to ensure optimal performance and ease of installation, but in other embodiments being adjustable to fit various previously installed or off-the-shelf box widths. In various embodiments, the system will accommodate different types of equipment beyond bicycles.

The rack system in various embodiments incorporates a parallelogram mechanism 145, as depicted by FIG. 2 with linear actuators or gas struts to extend from its storage position to a lower position, enhancing accessibility. In accordance with various embodiments, the arms of the parallelogram structure provide a supportive and connective mechanism linking the cargo box with the rack frame described herein. In the primary embodiment, a nested parallelogram design allows the rack to reach ground level, while an alternative embodiment uses a single parallelogram structure to lower the rack to an intermediate height. An aspect of the rack system is designed to extend across the rear of the vehicle, with its lower surface resting on the tire of the opposite door when fully retracted and in its locked position appropriate for the vehicle during travel, providing additional support and stability.

The system can integrate power-dependent features like LED brake lights, coolers, and air compressors, transforming the storage solution into a "smart cargo box." The system in an embodiment incorporates a rack frame. In an embodiment, the rack frame is substantially rectangular in shape and comprises dimensions of approximately 48 inches by 22 inches. In an embodiment, the rack frame comprises a substantially hollow assembly of aluminum members, though in other embodiments, the entirety of the rack frame comprises a substantially solid mass, a mesh or diamond grille, with various attachment points for attachment members suitable for retention of accessories intended for mounting upon an automobile roof rack. In various embodiments, the rack frame incorporates a modular design that enables the attachment of different mounts or securing mechanisms, allowing users to easily switch between different types of cargo. Safety features include a locking mechanism similar to a hood latch to secure the rack in place, as well as a guiding system to ensure proper alignment when raising the rack. Overall, the preferred embodiment of the invention aims to enhance the RV experience by providing a versatile, accessible, and efficient storage solution that addresses common challenges faced by RV and van conversion enthusiasts.

DETAILED DESCRIPTION

The present invention relates to an innovative storage and transportation system for recreational vehicles (RVs) 200 and van conversions, specifically designed to address the challenges of storing and accessing bicycles and other equipment. This versatile rack system in the preferred embodiment is mounted primarily upon a cargo box 110 intended to be attached to one of the rear swinging doors of a van-style RV 200. In various embodiments, the system itself comprises the cargo box 110. In alternative embodiments, elements of the system are designed to attach to an installed or uninstalled off-the-shelf cargo box 110. In various embodiments, the offers a range of benefits that significantly enhance the functionality and user experience of RV storage solutions.

Figure 4:
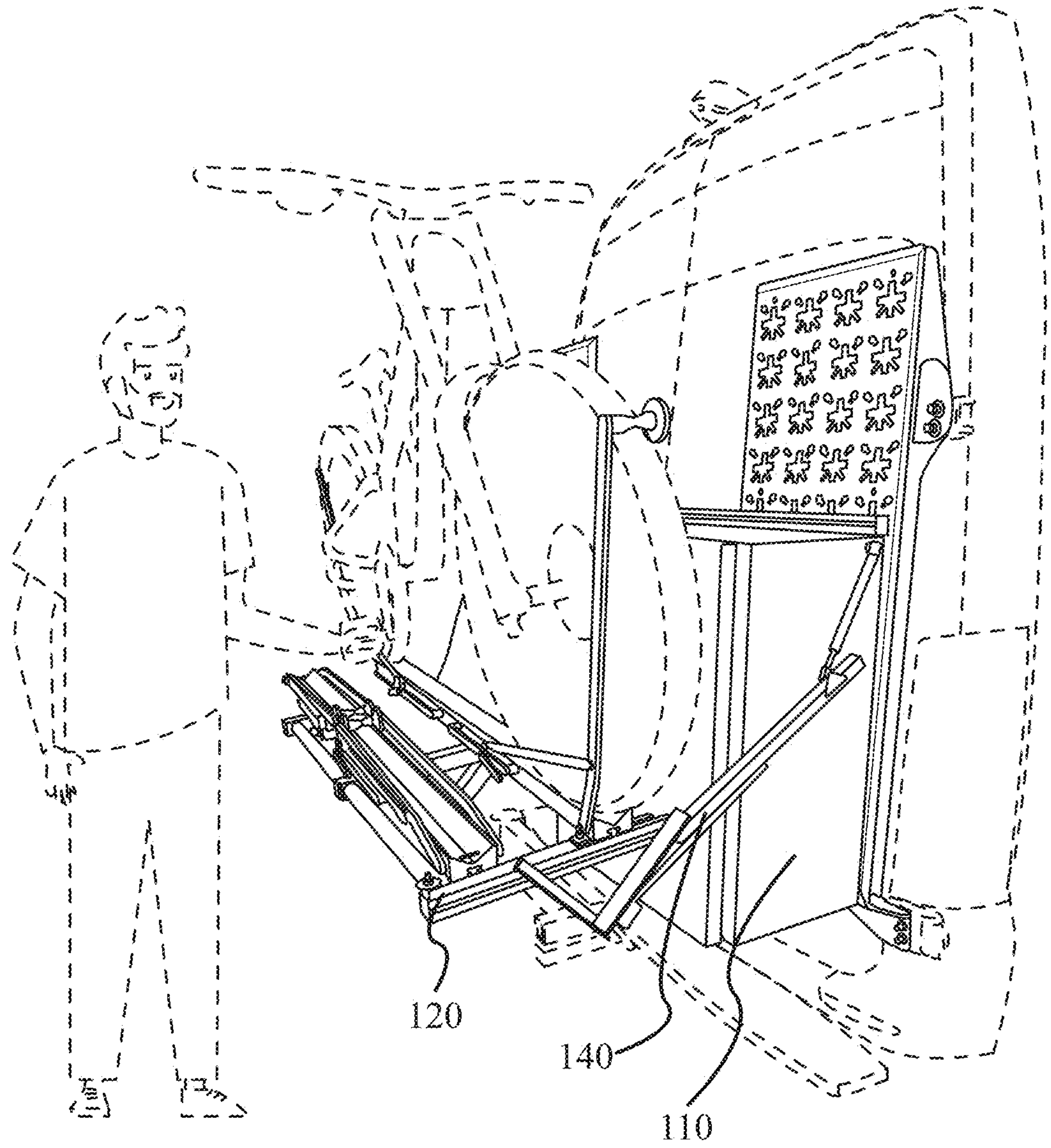
FIG. 4 depicts an intended use of the rack system with the rack frame of the rack system in a lowered position in an embodiment.

One of the key advantages of the preferred embodiment of the invention is its improved accessibility. The articulating mechanism allows the rack frame 120 to lower down, making it substantially easier for users to load and unload bikes or other items, as depicted by FIG. 4. This feature directly addresses the ergonomic challenges associated with traditional storage solutions that require lifting heavy equipment to chest or shoulder height. By enabling users to interact with their gear at a more comfortable level, the preferred embodiment of the invention promotes safety and ease of use, particularly for those with limited physical capabilities or after a strenuous day of outdoor activities.

Furthermore, the preferred embodiment of the invention excels in space efficiency and versatility. By utilizing the rear doors and cargo box 110, the preferred embodiment of the system maximizes storage capacity without encroaching on valuable interior living space or resorting to roof-mounted options that can negatively impact vehicle aerodynamics. The system's adjustable design allows it to comprise box sizes of varying dimensions, or otherwise fit various separately installed box widths, and its removable components can be replaced with mounts for other items such as generators or water containers. This flexibility ensures that the solution can adapt to the diverse needs of RV enthusiasts. Additionally, the integration of power-dependent features like LED brake lights, coolers, and air compressors transforms aspects of the system into a "smart cargo box," further enhancing its utility and functionality.

The preferred embodiment invention comprises a rack system mounted upon a cargo box 110, which optionally comprises an integral aspect of the system, and which is attached to one of the rear swinging doors of a van recreational vehicle. This rack frame 120 is designed to be versatile, capable of holding bicycles or various other items, addressing the diverse storage needs of RV enthusiasts. In an embodiment of the invention, the rack frame 120 is configured such that any item mountable to a standard vehicle roof rack is mountable to the rack frame 120. The rack system is designed with versatility in the preferred embodiment, allowing it to accommodate a wide range of devices and items, especially those typically mounted on standard vehicular roof racks. This flexibility is achieved through a universal mounting interface on the rack frame 120, which is designed to maximize compatibility with standard roof rack mounting systems. This allows users to attach various devices and accessories designed for roof rack installation.

The rack frame 120 in its preferred embodiment incorporates a modular design that enables the attachment of different mounts or securing mechanisms. This modularity allows users to easily switch between different types of cargo, such as bicycles, generators, fuel containers, or water tanks. The aluminum construction of the rack frame 120 in the preferred embodiment provides a sturdy yet lightweight base for attaching various mounting systems. The substantially rectangular shape of the rack frame 120 allows for multiple attachment points, accommodating different sizes and shapes of equipment.

Figure 1:
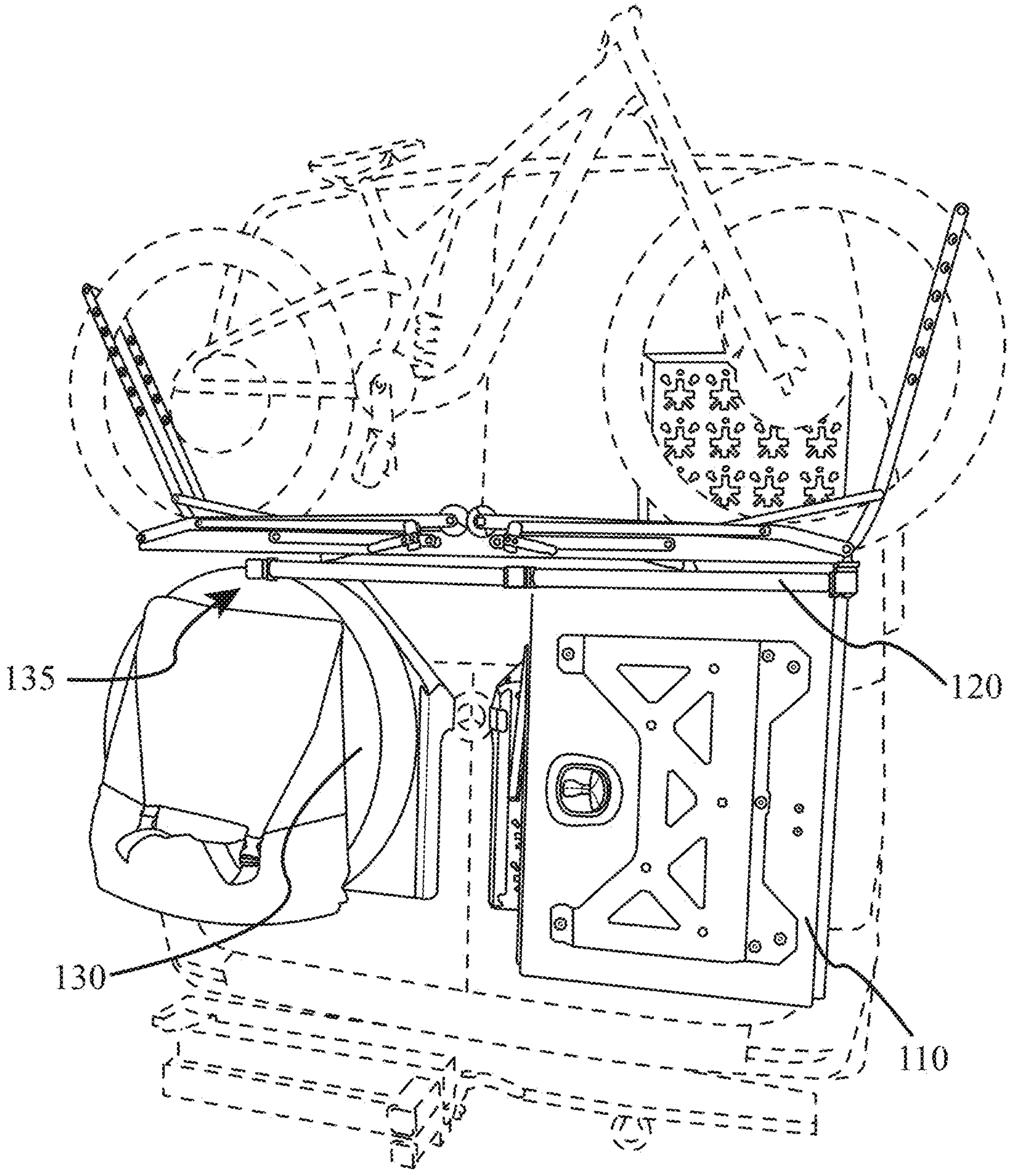
FIG. 1 depicts a rear view of the rack system mounted upon a RV in an embodiment.
Figure 2:
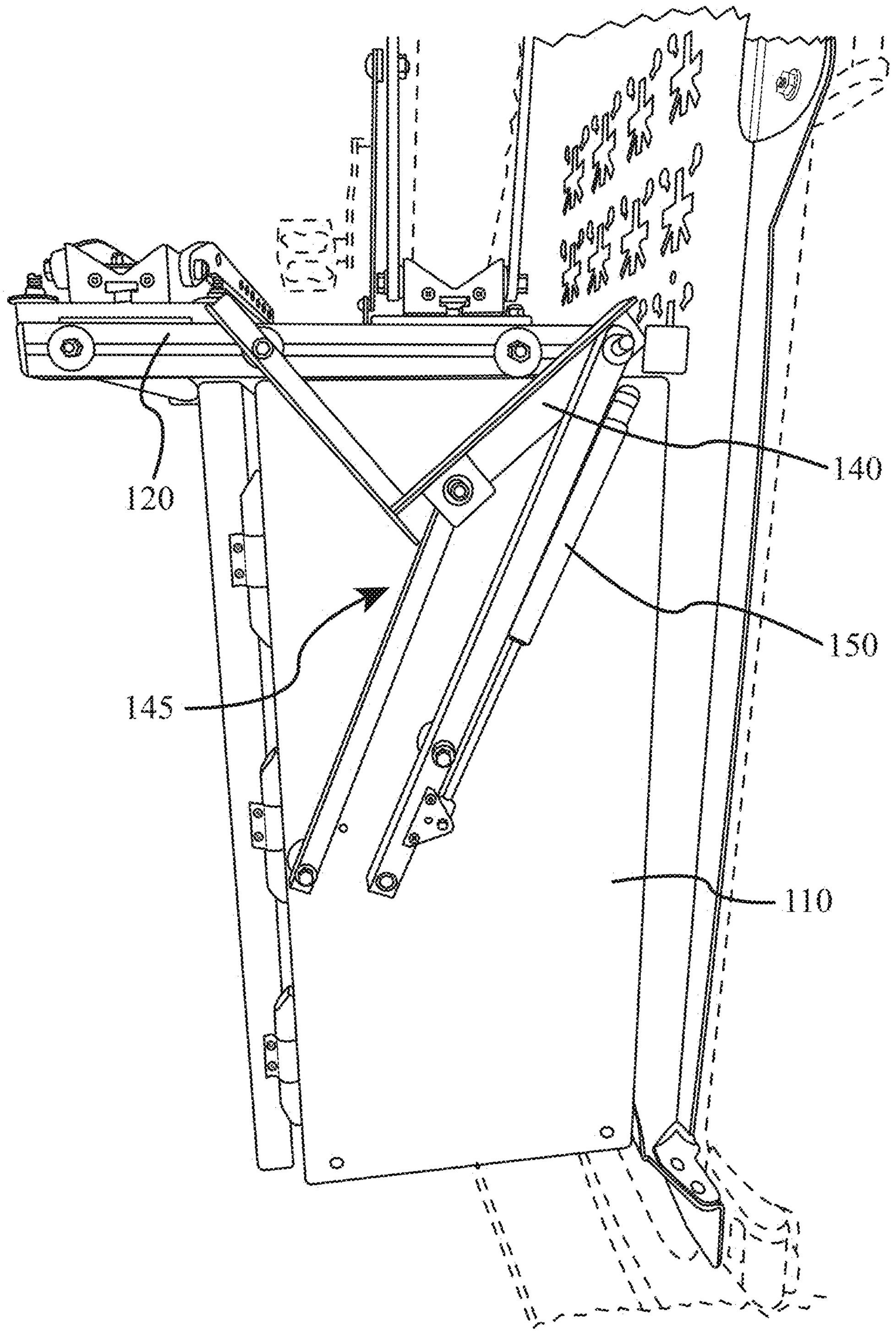
FIG. 2 depicts a first side view of the rack system mounted upon a RV in an embodiment.
Figure 3:
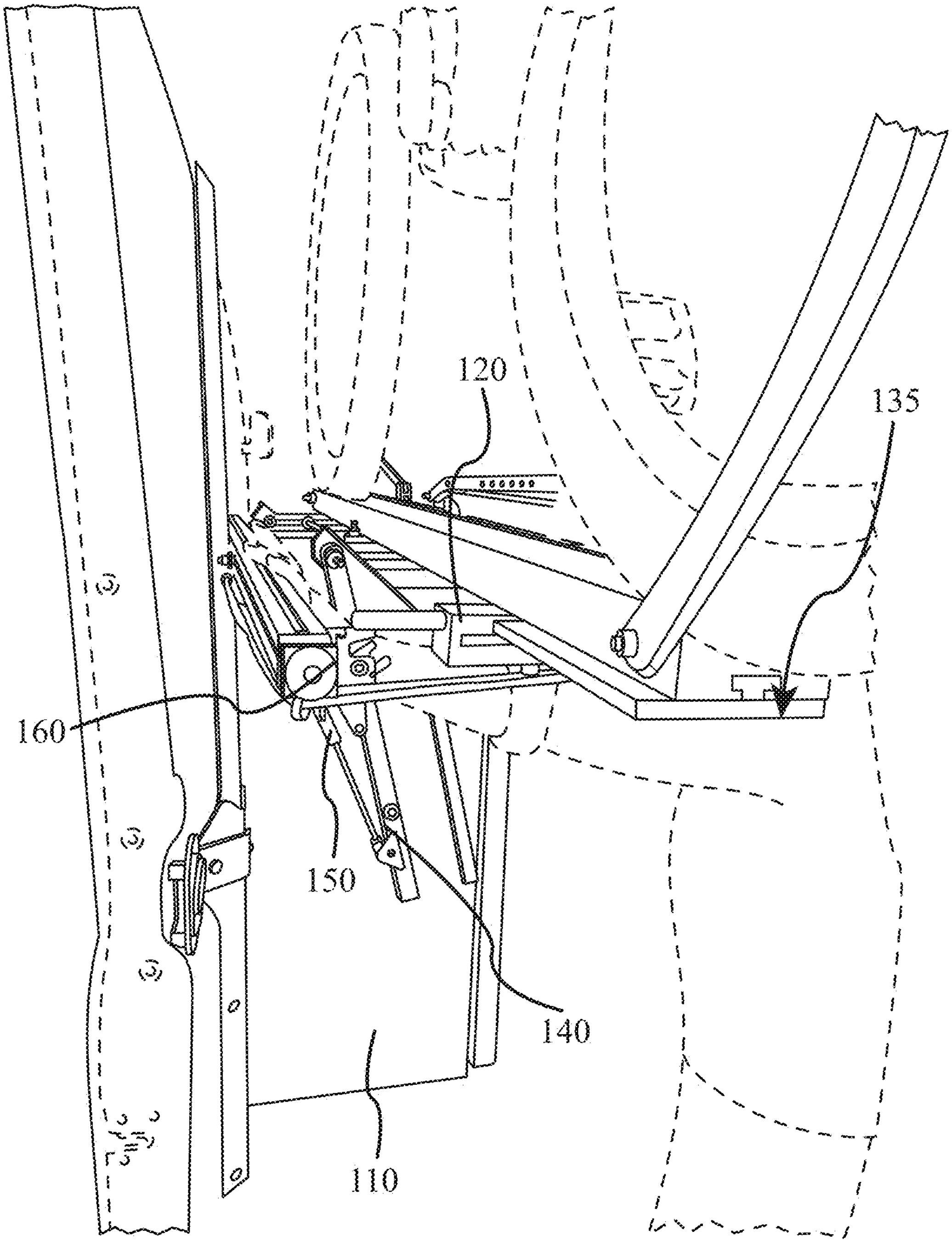
FIG. 3 depicts a second side view of the rack system mounted upon a RV and in particular its locking mechanism in an embodiment.
Figure 5:
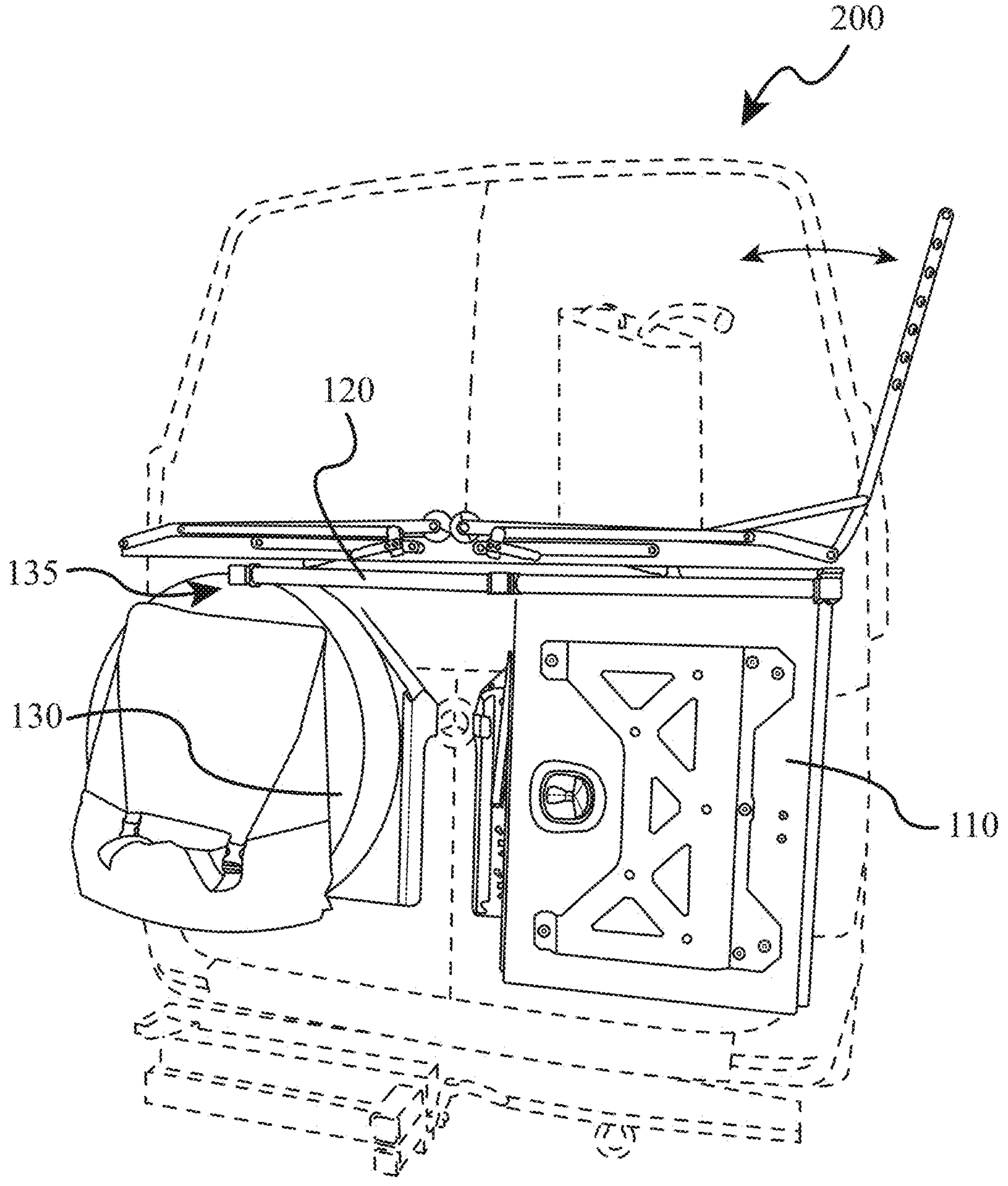
FIG. 5 depicts a rear view of the rack system mounted upon a RV retaining non-bicycle cargo in an embodiment.
Figure 6:
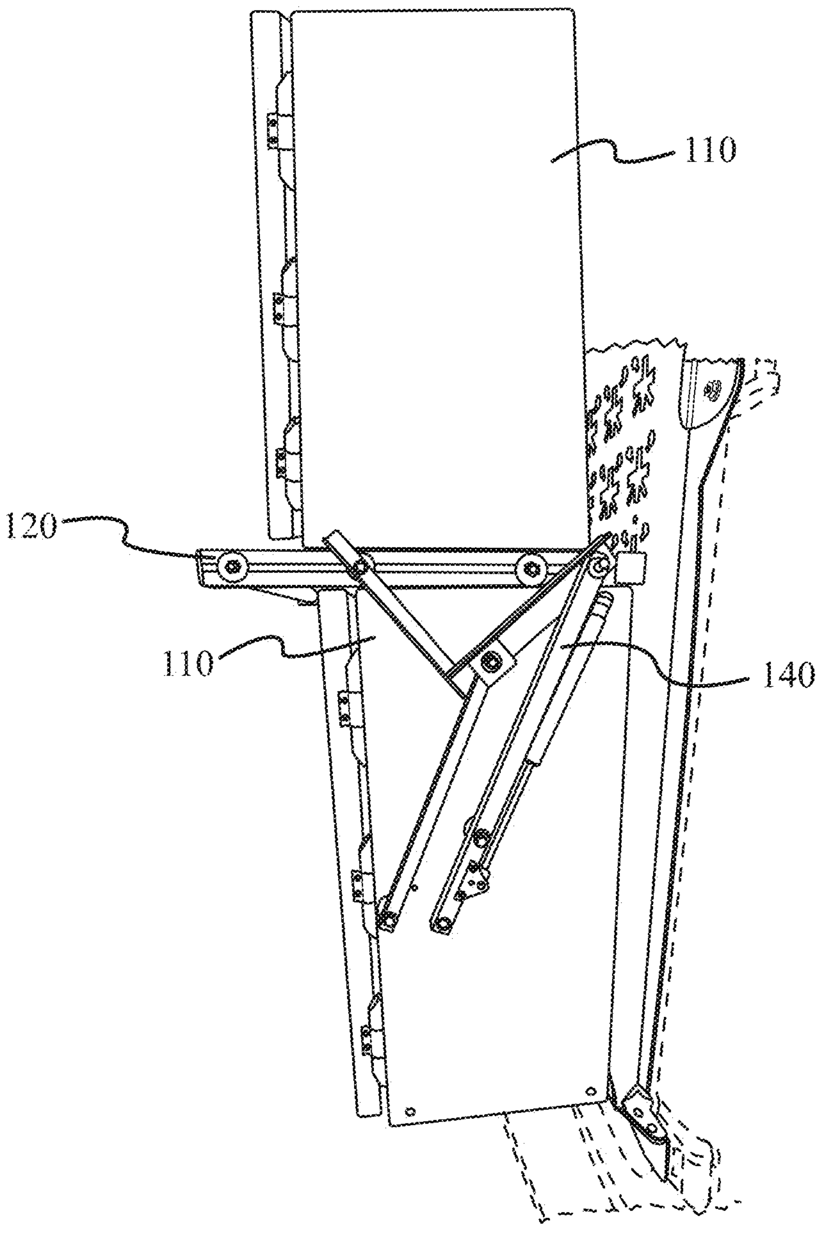
FIG. 6 depicts a side view of the rack system showing structural details in an embodiment.

In its preferred embodiment, the rack frame 120 is designed to incorporate racks to retain one or more bikes along the length of the rack frame 120, as depicted in FIG. 1, however a key feature of the rack system in the preferred embodiment is its ability to remove and replace the bike mount component with mounts for other items. This specifically includes the ability to attach mounts for generators, extra fuel, and water containers to the rack frame, as depicted by FIG. 5 in an exemplary embodiment. The rack frame's 120 design takes into account weight distribution, which is crucial when carrying heavy items like generators or fuel containers. The parallelogram mechanism 145 associated with the rack system and its ability to rest on the tire of the opposite door help in maintaining stability with various types of loads in accordance with varying embodiments.

The rack frame 120 incorporates secure attachment points that can accommodate different types of mounting hardware, such as bolts, clamps, or specialized brackets, ensuring that various items can be safely secured to the rack frame 120 in varying embodiments. Additionally, the rack frame's 120 configuration in the preferred embodiment allows for the integration of aftermarket roof rack accessories, expanding its functionality to match user-specific needs.

By incorporating these features, the rack system provides a versatile platform that can adapt to various cargo needs, mirroring the functionality of a standard roof rack while offering the unique benefits of its lowering mechanism and integration with the vehicle's rear-mounted cargo box 110 in accordance with varying embodiments. This design ensures that the rack system can be used for a wide range of purposes, from carrying bicycles to transporting essential equipment and supplies for outdoor adventures.

The rack frame 120 in the preferred embodiment is a key component of a larger storage and transportation system specifically engineered for recreational vehicles and van conversions. Its primary function in accordance with the preferred embodiment is to provide a secure and accessible platform for storing and transporting bicycles, but its versatility allows it to accommodate other equipment as well.

The mounting location of the system on one rear swinging door is strategic in accordance with the preferred embodiment, utilizing often overlooked space on the vehicle. This placement maximizes storage capacity without encroaching on the interior living space of the RV, a common issue with traditional storage solutions. By comprising a cargo box 110, or otherwise being attached to the cargo box 110, on a rear door of a RV, the rack system takes advantage of existing structures on the vehicle, integrating seamlessly with the RV's design.

Aspects of the rack system are designed to extend from the door on which it is mounted to a position closer to the opposite rear door of the recreational vehicle 200, optionally a van. This extension allows the lower surface of certain parts of the rack system at a resting point 135 to rest upon the upper aspect of the tire 130 mounted on the other door as depicted by FIG. 1, providing additional support and stability. In alternative embodiments, certain parts of the rack system are configured to rest upon a tire mount previously installed on the vehicle, or custom receiver that is designed to be attached to the door opposite of the mounting location of the other elements of the system, and customized to interact with other aspects of the system. In accordance with the preferred embodiment, the rack system's design takes into account the geometry of the van's rear aspects. It is angled slightly to be generally parallel with the back aspect of the van as a whole, rather than aligning with an individual door. This angled configuration enables aspects of the rack system to extend across the rear of the vehicle, positioning it in a way that allows contact at a resting point 135 superior to the tire 130, tire mount, or custom receiver on the opposite door.

In an embodiment, the invention incorporates a spring or elastic member linking the rack frame 120 in an extended form to a more superior aspect of one side of the assembly to counterbalance the weight of the rack and its contents on the one side of the assembly, thus preventing the mechanism from leaning to one side during operation. In an exemplary embodiment, the spring or elastic member is attached between two points on the rack system: one point on the fixed member immovably affixed to the cargo box 110 and another on an aspect of the movable rack frame 120. This configuration creates tension that counteracts the natural tendency of the loaded rack to lean towards its heavier side in accordance with an exemplary embodiment. A purpose of this spring or elastic member is to act as a counterbalance to the weight of the rack and its contents. By providing an opposing force, it helps to maintain the rack's balance and prevents it from tilting or leaning excessively to one side during the raising or lowering process. In an exemplary embodiment, the counterbalancing mechanism works in conjunction with the parallelogram structure of the rack system's arms 140 and the linear actuators 150 to ensure smooth, controlled movement of the rack.

One of the most distinctive aspects of this rack system is its articulating mechanism. This feature allows an inferior aspect of the rack frame 120 to rest at a resting point 135 on a superior aspect of the tire 130 mounted on the other rear swinging door in an embodiment. In addition to providing support for the rack system when locked in place for transit, this design feature helps to keep the load closer to the vehicle, improving overall balance and handling. This dual-support system—with aspects of the rack being mounted on one door and resting on the tire 130 attached to the other door at a resting point 135—provides enhanced stability and weight distribution, crucial factors when transporting heavy items like bicycles. The contact between the lower surface of the rack and the upper aspect of the tire 130 at a resting point 135 while the rack frame 120 is in its stowed position provides several benefits. It offers additional support by creating an extra point of contact, which helps distribute the weight of the loaded items more evenly. This contact also enhances stability, particularly when the vehicle is in motion or during loading and unloading of items.

In an embodiment, the system incorporates a parallelogram mechanism 145 in association with its arms 140 in combination with a weight compensating force, which in accordance with various embodiments is provided by gas struts, springs, and/or linear actuators 150 to extend the rack from its storage position on top of the cargo box 110 to a lower position, enhancing accessibility and functionality. In accordance with an embodiment, the arms 140 are each approximately 450 millimeters in length. In accordance with an embodiment, the gas struts and/or linear actuators 150 utilized in the rack system are approximately 16" long with a 6" stroke. In the preferred embodiment, a nested parallelogram design allows the rack to reach ground level, while an alternative embodiment utilizes a single parallelogram structure that lowers the rack to an intermediate height, such as waist level.

The parallelogram mechanism 145 in an embodiment comprises pairs of arms 140 and/or struts that remain parallel to each other throughout the movement, maintaining the rack's orientation relative to the ground. Linear actuators 150, or in an alternative embodiment gas struts, control the movement of the parallelogram structure. These actuators provide more precise control and provide an assistive ability to handle and lift heavier loads. A suitable linear actuator for this system in an embodiment comprises a 6-inch stroke actuator capable of exerting 1800 pounds of force.

An actuation system, controlled in an exemplary embodiment by a button located on the posterior aspect of the lower frame, coordinates the movement of the linear actuators 150. When activated, this button sends signals to the actuators, which in an exemplary embodiment are communicatively connected via wires, extending or retracting the parallelogram mechanism 145 by force generated by the synchronized linear actuators 150. The synchronized motion ensures that the rack frame 120 maintains its substantially parallel orientation to the superior planar aspect of the cargo box 110 or the ground throughout its range of motion.

The linear actuators 150 also assist with lifting heavy loads back into the stowed position, providing the necessary force to raise the rack frame 120 and its contents. This lifting assistance is particularly beneficial for users who may have difficulty manually lifting heavy items, such as bicycles or generators, to the height of the cargo box 110 from the lowest available height of the rack frame 120.

In the alternative embodiment with a single parallelogram structure, the rack does not lower all the way to the ground but instead reaches an intermediate height, such as waist level. This design still offers improved accessibility compared to a fixed rack while maintaining a simpler mechanical structure. The single parallelogram mechanism 145, combined with the linear actuators 150, allows for a controlled descent and ascent of the rack, maintaining its parallel orientation to the ground throughout the movement.

An enhanced embodiment incorporates a nested parallelogram mechanism that enables the rack to extend all the way to ground level, providing maximum accessibility for loading and unloading operations. This configuration utilizes two parallelogram structures in series, with the primary parallelogram lowering the rack to an intermediate position and a secondary nested parallelogram extending the rack to ground level. The nested design maintains the parallel orientation of the rack surface throughout the extended range of motion.

The ground-level access capability in an embodiment facilitates easier loading by allowing users to roll bicycles directly onto the rack frame rather than lifting them. This feature is particularly beneficial for heavy electric bicycles or when users have physical limitations that make lifting difficult. The nested parallelogram mechanism requires additional linear actuators or gas struts to control both levels of movement, with synchronized operation ensuring smooth transition between the intermediate and ground-level positions.

Various embodiments address the invention's goal of improving accessibility, particularly for elderly users or those with physical limitations. By allowing the rack to extend to a lower position, whether ground level or waist height, it enables users to more easily load and unload items, optionally attaching them to the rack frame 120 by roof rack-compatible attachment components, without having to lift them to the full height of the cargo box 110.

The incorporation of linear actuators 150 powered by the vehicle's electrical system ensures consistent and reliable operation of the rack system. This power source can provide the necessary energy to operate the actuators, even when lifting heavy loads back into the stowed position. In an embodiment, the power is derived from a wire connection to the power supply associated with the trailer hitch, optionally in a similar manner to that described further herein in connection with the provision of power supply to the smart cargo box. Overall, the parallelogram mechanism 145 comprising linear actuators 150 significantly enhances the functionality and user-friendliness of the rack system, allowing for improved access while maintaining a compact and integrated design when stowed for vehicular travel.

The ability of the rack to rest on the tire 130 at a resting point 135 is facilitated by linear actuators 150 in accordance with an embodiment that control the rack's movement, as further described herein. These components allow for precise positioning of the rack frame 120, ensuring proper contact with the tire 130 when the rack is fully lowered. The actuators are controlled by a button located on an aspect of the rack frame 120, allowing for easy operation and adjustment of the rack frame's 120 position.

As the rack frame 120 is raised from its lowered position, it moves towards the top of the cargo box 110 while the plane of the rack frame 120 maintains its substantially parallel orientation to the top planar surface of the box. This movement is facilitated by the parallelogram mechanism 145, which comprises arms 140 or struts attached to the lateral planar surface of the cargo box 110 and further extends to a connection with the rack frame 120. As the rack frame 120 is raised, these arms 140 retract, allowing the rack frame 120 to reach its stowed position on top of the cargo box 110. During this process, the rack frame 120 aligns with the support bar, and an aspect of the rack frame 120 or a mass connected to the rack frame 120 settles onto the resting point 135 superior to a tire 130, tire frame, or custom receiver mounted upon the opposing door, providing additional stability when the rack frame 120 is in the fully raised, locked and stowed position.

The rack system mounting comprises a parallelogram mechanism 145 that ensures that the rack frame 120 remains level and that its plane substantially parallel to the top planar surface of the cargo box 110 during movement. As rack frame 120 articulates off the top of the cargo box 110 and towards the ground, it lowers down while maintaining its parallel orientation to the top planar surface of the cargo box 110. This aspect of the preferred embodiment of the rack system intended to maintain a planar surface substantially parallel to the plane of the superior planar aspect of the cargo box 110, and in various examples substantially with the surface that the vehicle sits upon, significantly reduces the risk of items sliding off during the loading or unloading process, addressing a common safety concern with existing rack systems.

The parallelogram mechanism 145 that keeps the rack level and parallel to the top planar surface of the cargo box 110 during movement in accordance with the preferred embodiment is achieved through a system of arms 140 attached to the lateral planar surface of the cargo box 110. In an exemplary embodiment, these arms 140 are approximately 15 inches in length, though this dimension may be subject to change based on engineering requirements.

The parallelogram mechanism 145 incorporates an over-center/cam design that enhances the stability and safety of the rack system. This design ensures that when the rack frame 120 is in its fully raised position on top of the cargo box 110, it must overcome a specific force to initiate the downward movement. In an embodiment, the over-center configuration creates a mechanical advantage that keeps the rack frame 120 securely in place on top of the box, even if the locks or other safety features were to fail. As the rack frame 120 begins to lower, it must first move slightly upward and over the center point before descending, providing an additional layer of security against unintended deployment. This design feature is particularly important in accordance with the preferred embodiment for maintaining a retained load's position upon the rack frame 120 during transit, ensuring that equipment will remain safely stowed on top of the cargo box 110, even in the unlikely event of a primary safety system failure.

The arms 140 are arranged in a parallelogram configuration 145 in an embodiment, with opposing arms 140 remaining parallel to each other throughout the movement of the rack frame 120. This structure is formed by the cargo box 110 surface, the rack frame 120, and two pairs of arms 140 connecting the cargo box 110 to the rack frame 120. In embodiment, each of the arms 140 comprises a steel strut approximately 15" in length. In various embodiments, the arms 140 comprise multiple components and are connected together at a joint. In embodiments, the opposing arms 140 further comprise additional joints and substructures to facilitate the ease of movement. This parallelogram mechanism 145 ensures that as the rack articulates off the top of the box rearward and downward, it lowers down while keeping the plane of the rack parallel to the top planar surface of the box. This design significantly reduces the risk of items sliding off during the loading or unloading process, addressing a common safety concern with existing rack systems.

In the preferred embodiment, an aspect of each set of opposing arms 140 is attached to the lateral planar surface of the cargo box 110, and another aspect is attached to the rack frame 120. In an exemplary embodiment, this is facilitated via pivot points, allowing for smooth rotation while maintaining the parallelogram structure. The arms 140 in an embodiment in each pair are of equal length, which is crucial for maintaining the parallelogram shape and ensuring that the rack remains parallel to the top planar surface of the box during movement. As the rack frame 120 is lowered or raised, all arms 140 move in unison, with this synchronized movement being key to maintaining the parallel orientation of the rack frame 120 relative to the superior cargo box 110 surface.

The arms 140 are constructed of steel in accordance with the preferred embodiment to provide the necessary strength and rigidity for supporting the weight of the rack and its contents while maintaining the parallelogram structure. In accordance with the preferred embodiment, they are attached to the cargo box 110 using ⅜" bolts on bushings, with a steel reinforcement plate used inside the box to provide additional support and distribute the load.

The mounting of the arms 140 to the cargo box 110 is facilitated by drilling holes through the lateral vertical planar surface of the cargo box 110 when mounted to a vehicle. This process involves drilling holes through the lateral vertical planar surface of the cargo box 110, which serve as attachment points for the arms 140 of the rack system. The system utilizes ⅜" bolts on bushings, providing a secure connection between the arms 140 and the cargo box 110, while the bushings help to distribute the load and reduce wear on the attachment points. A steel reinforcement plate is installed inside the cargo box 110, which provides additional structural support to the attachment points, helps distribute the load across a larger surface area of the cargo box 110, and reinforces the area around the drilled holes to prevent potential damage or weakening of the cargo box 110 structure. The mounting process likely involves inserting the bolts through the arms 140, then through the drilled holes in the cargo box 110, and finally through the steel reinforcement plate inside the box, with the bushings positioned appropriately to ensure proper fit and load distribution. Various embodiments of the invention reflect either of two primary production approaches for the storage and transportation system described herein. The first approach involves producing a system comprising a finished cargo box 110 with the articulating mechanism pre-installed, offering a complete and integrated solution ready for installation in its entirety. The present inventor has recognized that this method would provide optimal performance and ease of installation for new users. The second approach involves producing the system as a retrofit option for separately produced and/or installed cargo boxes, the system in such embodiments comprising the arm-related elements on each side, a rack frame 120, and a mounting plate with pre-drilled holes. This retrofit option would allow existing RV owners to upgrade their current cargo boxes with the articulating rack system. The steel reinforcement plate inside the box would come pre-drilled to match the hole pattern required for mounting the arms 140, facilitating easier installation for those choosing the retrofit option. This dual approach ensures that the invention can cater to both new RV purchasers seeking an integrated solution and existing RV owners looking to enhance their current storage capabilities. In various embodiments, the system is designed to ensure a robust and secure attachment of the rack arms 140 to the cargo box 110, capable of supporting the weight of the rack and its contents while also withstanding the dynamic forces experienced during vehicle movement.

To assist with the movement of the rack and maintain its position, linear actuators or gas struts 150 are incorporated into the system. These mechanisms provide controlled movement of the parallelogram mechanism 145. In accordance with the preferred embodiment, an activation mechanism, in one example a button, is located on an aspect of the rack frame 120, which when activated by a user actuates the linear actuators 150, allowing for easy raising and lowering of the rack while maintaining its parallel orientation. The actuation mechanism for lifting or lowering the rack frame 120 utilizes linear actuators 150 controlled by a button located on an aspect of the rack frame 120.

The actuation mechanism, when activated by the user, sends an electrical signal to the linear actuators 150. In various embodiments the linear actuators 150 are electromechanical devices that convert rotational motion of a motor into linear motion, extending or retracting a shaft. In accordance with the preferred embodiment, the linear actuators 150 are synchronized to move in unison, maintaining the parallel orientation of the rack during raising or lowering. An example of a linear actuator suitable for this context would be a 6-inch stroke actuator capable of exerting in excess of 250 pounds of force, and in one exemplary embodiment, 1800 pounds of force. The 16-inch stroke length allows for sufficient range of motion to lower the rack from its stored position to a more accessible height. The actuation mechanism and linear actuators or gas struts 150 in accordance with an embodiment comprise portions of an actuation system useful in the context of the invention to assist users with raising or lowering the rack. In accordance with embodiments, placement of the actuation mechanism on the posterior aspect of the lower frame allows for convenient access when operating the rack. This positioning enables users to control the rack's movement while standing at the rear of the vehicle, providing a clear view of the rack and its surroundings during operation.

The dual linear actuator configuration in accordance with an embodiment provides precise control and substantial lifting power for applications requiring synchronized movement. Each linear actuator in the preferred embodiment comprises a 16-inch overall length with a 6-inch stroke capability, rated to exert 1800 pounds of force. The actuators are electrically synchronized through a control circuit that ensures simultaneous extension and retraction, maintaining the parallel orientation of the rack frame throughout its range of motion. The control button, positioned on the posterior aspect of the lower frame, sends coordinated signals to both actuators via a wiring harness that connects the actuators in parallel configuration. This synchronized operation prevents binding or misalignment that could occur if the actuators operated independently.

The mounting configuration in an embodiment for the dual actuators utilizes reinforced brackets attached to both the cargo box structure and the parallelogram mechanism arms. Each actuator is secured using hardened steel mounting pins with self-lubricating bushings to minimize friction and ensure smooth operation under load. The electrical connections are weatherproofed using marine-grade connectors and sealed wiring harnesses rated for automotive applications.

The actuation system in an embodiment further comprises a control unit that interprets the button press and coordinates the movement of the actuators. This control unit manages the synchronization of the actuators to ensure smooth, level movement of the rack. It may also incorporate safety features such as overload protection to prevent damage to the mechanism or injury to users. In an embodiment, power for the linear actuators 150 is supplied through the trailer hitch electrical hookup, which typically provides a 12V power source. Some vehicles offer up to 30 Amp 12V service for trailer use, which would be sufficient to power the actuators, which is suitable for use in a configuration. In an alternative configuration, the power source for the actuators is a battery or plurality of batteries placed within the cargo box 110.

By incorporating powered linear actuators instead of gas struts 150, embodiments of the invention provide several advantages. Linear actuators 150 offer more precise control over the rack's position, can handle heavier loads, and provide consistent performance over time. They also facilitate the potential integration of additional features, such as programmable height settings or automatic leveling in exemplary embodiments, which could further enhance the rack's functionality and ease of use.

In varying embodiments, the assembly of the system further comprises a locking mechanism 160 for securing the movable rack frame 120 to the cargo box 110. In the preferred embodiment, the locking mechanism 160 designed to function similarly to a hood latch mechanism. This system ensures that the rack remains securely in place, even if there is a failure in the actuation mechanism.

In an embodiment, the locking mechanism 160 comprises two main components: a latch or catch that is attached to an extended member immovably fixed to the cargo box 110, and a corresponding locking element attached to the movable rack frame 120. In an embodiment, when the rack is raised to its fully closed position, the locking element on the rack frame 120 engages with the latch on the cargo box 110. This engagement creates a secure connection that prevents the rack from inadvertently lowering or moving during transit. The hood latch-style mechanism in an embodiment incorporates a spring-loaded component that automatically engages when the rack is raised to the proper position. This feature ensures that the lock engages reliably every time the rack is closed, without requiring additional user intervention. To release the lock, in an embodiment, a user-operated release mechanism is incorporated into the design. In various embodiments, the release mechanism comes in the form of a lever or handle positioned for easy access, allowing the user to disengage the lock when they need to lower the rack.

The locking mechanism 160 is designed to work in conjunction with the linear actuators 150 and parallelogram arms 145 of the rack system in an embodiment. It provides an additional layer of security, ensuring that even if there is a failure in the primary actuation system, the rack will remain safely locked in its raised position.

This safety feature addresses potential concerns about the rack accidentally lowering during transit, which could pose risks to the vehicle, the stored items, and other road users. By incorporating a reliable locking mechanism 160, aspects of the invention enhance the overall safety and reliability of the rack system in an embodiment. Additionally, the over-center/cam design of the mechanism provides an extra layer of security. When the rack is in its fully raised position on top of the cargo box 110, it must overcome a specific force to initiate downward movement. This design creates a mechanical advantage that keeps the rack securely in place, even if the primary locking mechanism 160 or other safety features were to fail. The over-center configuration requires the rack to move slightly upward and over the center point before descending, further preventing unintended deployment during transit. This dual safety approach-combining the locking mechanism 160 with the over-center/cam design-significantly reduces the risk of accidental lowering and enhances the overall safety and reliability of the storage system for users and other road users in accordance with the preferred embodiment.

In accordance with an embodiment, the movable rack frame 120 incorporates a protrusion designed to interact with a corresponding receptacle located on a member that is immovably fixed to the cargo box 110. This guiding mechanism helps ensure that the movable rack frame 120 aligns properly as it is raised into its locked position. In an embodiment, the protrusion consists of a sturdy, rigid component extending from the movable frame, positioned to align with the receptacle on the fixed member of the cargo box 110. As the rack is raised, this protrusion enters the receptacle, which acts as a guide channel. The shape and dimensions of both the protrusion and receptacle are engineered to provide a snug fit, allowing for smooth movement while effectively guiding the rack into its final position. This guiding mechanism works in conjunction with the parallelogram arms 145 and linear actuators 150 to ensure precise alignment of the rack as it is placed into its fixed position for vehicular travel. The protrusion and receptacle system helps to overcome any minor misalignments that might occur due to the weight of the load or slight flexing of the components during the raising process. As the rack nears its travel position, the protrusion-receptacle interaction guides the rack into the exact position required for the locking mechanism 160 to engage properly. This ensures that the hood latch-style locking mechanism 160 can securely fasten the rack in place, providing an additional layer of safety and stability.

The construction of the rack in various aspects prioritizes durability and weight management. The frame of the rack is constructed from aluminum, chosen for its lightweight properties and resistance to corrosion. This material choice helps to minimize the overall weight added to the vehicle while ensuring longevity of the product. While in the preferred embodiment the frame of the rack is constructed from aluminum, chosen for its lightweight properties and resistance to corrosion, the arms 140 of the rack mounting are specifically constructed of steel. The use of steel for the arms 140 of the rack mounting provides superior strength and rigidity, crucial for supporting heavy loads such as bicycles or other equipment. Steel's robust nature ensures that the mounting arms 140 can withstand the stresses and strains associated with vehicle movement and the weight of the stored items. Meanwhile, the aluminum construction of the rack frame 120 and lower frame helps to minimize the overall weight added to the vehicle. Aluminum's lightweight properties contribute to fuel efficiency and easier handling of the rack system during installation or adjustment. Additionally, aluminum's natural resistance to corrosion enhances the longevity of the product, particularly important for outdoor use in various weather conditions.

The material selection for the rack system in an embodiment prioritizes both strength and weight optimization based on the specific requirements of each component. The parallelogram mechanism arms are constructed from steel to provide the necessary strength and rigidity for supporting heavy loads, as aluminum construction was found to exhibit excessive flex under load conditions. The steel arms utilize ⅜-inch bolts on bushings for attachment points, with a steel reinforcement plate installed inside the cargo box to distribute loads and prevent structural damage to the box walls.

The rack frame itself in an embodiment is constructed from aluminum to minimize overall weight addition to the vehicle while providing adequate strength for equipment mounting. The aluminum construction contributes to fuel efficiency and easier handling during installation and adjustment procedures. The mounting hardware utilizes marine-grade stainless steel fasteners to resist corrosion in outdoor environments, with all pivot points incorporating self-lubricating bushings to ensure smooth operation and minimize maintenance requirements.

Adaptability is indeed a key feature of this rack system, designed to accommodate a wide range of recreational vehicle (RV) models and cargo box 110 sizes. The adjustable nature of the rack allows it to fit various box widths, significantly enhancing its compatibility and market potential.

While the invention description does not provide specific dimensions for a typical cargo box 110, we can infer that the rack system is designed to work with standard rear-mounted RV boxes. A common size for such boxes in accordance with an exemplary embodiment is approximately 48 inches (122 cm) wide, 24 inches (61 cm) high, and 24 inches (61 cm) deep. However, it's important to note that these dimensions can vary based on the specific RV model and the specific cargo box chosen to attach to a given RV.

In one embodiment, the invention primarily comprises a simple box lift mechanism designed to attach to a cargo box on the rear door of a recreational vehicle. This box lift utilizes a parallelogram linkage system that enables vertical movement of the cargo box while maintaining its orientation parallel to the ground throughout the range of motion.

The parallelogram linkage includes a plurality of steel strut arms, approximately 15 inches in length, connected via ⅜" bolts on bushings. The mechanism attaches to the cargo box via a steel reinforcement plate mounted inside the box to distribute load and provide structural integrity. This reinforcement plate includes pre-drilled holes for securing the strut assembly.

In this embodiment, the box lift can be powered by either gas struts or linear actuators. When configured with gas struts, they are selected to compensate for the specific weight of the cargo box (approximately 300 pounds) with a slight positive bias to assist in raising the mechanism while maintaining stability when fully lowered. This prevents rapid descent when heavy loads are placed in the box.

In an alternative embodiment, the system utilizes gas struts instead of linear actuators to provide weight compensation and controlled movement. The gas struts are specifically configured to compensate for approximately 300 pounds of weight with a slight positive bias that assists in raising the mechanism while maintaining stable position when fully lowered. This positive bias prevents rapid descent when heavy loads are placed on the rack while providing lifting assistance during the raising operation.

The gas struts in an embodiment comprise nitrogen-filled cylinders with pressure ratings between 150-200 PSI at ambient temperature. Each strut features a 16-inch extended length with a 6-inch stroke and incorporates a progressive damping mechanism that increases resistance as the strut approaches full compression. This damping characteristic prevents slamming when lowering heavy loads and ensures controlled movement throughout the operating range. The slight positive bias is achieved through an internal valve system that creates approximately 5-10 pounds of lifting force when the strut is fully extended, sufficient to assist users while maintaining stability when loaded.

In various specific embodiments utilizing gas struts for weight compensation, the system employs nitrogen-filled gas struts with pressure ratings between 150-200 PSI at ambient temperature (20° C.). Each gas strut comprises a 16-inch extended length cylinder with a 6-inch stroke, an outer diameter of 1.65 inches, and sealed with Viton® O-rings to ensure optimal performance across temperature ranges from −30° C. to +80° C. typically encountered in operational environments.

The slight positive bias that assists in raising the cargo box while maintaining position when fully lowered in accordance with an embodiment is achieved through a precision-engineered valve system within each gas strut. This valve system creates an asymmetrical pressure differential across the piston, resulting in approximately 5-10 pounds of positive lifting force when the strut is fully extended. The valve employs a progressive damping mechanism that increases resistance as the strut approaches full compression, preventing rapid descent when loaded.

The 300-pound weight compensation is achieved in an exemplary embodiment through precise engineering calculations based on mechanical advantage principles. The parallelogram linkage system provides an approximate 2:1 mechanical advantage ratio when properly configured, allowing two gas struts each rated for 150 pounds of force to effectively compensate for the 300-pound total weight. This calculation accounts for the moment arm created by the distance between the mounting points and the center of mass of the loaded cargo box.

For optimal performance, in an embodiment the gas struts are mounted at specific angles relative to the parallelogram mechanism. The preferred mounting configuration positions the gas struts at a 65° angle relative to the horizontal plane when the system is in the fully lowered position, and at a 35° angle when in the fully raised position. This angular configuration maximizes the effective force throughout the range of motion. Each strut is secured using 10 mm diameter hardened steel mounting pins with self-lubricating bushings to minimize friction and wear at the pivot points. In accordance with an exemplary embodiment, the mounting brackets are fabricated from 4 mm thick steel plate and reinforced with triangular gussets to distribute load forces across a wider surface area of the cargo box and rack components.

In an alternative configuration utilizing linear actuators, a 16-inch linear actuator with 6-inch stroke capable of 1800 pounds of force can be employed. The actuator can be activated via a button mounted on an accessible portion of the mechanism. Power for the linear actuators can be supplied through the trailer hitch electrical hookup, which typically provides a 12V power source.

To ensure stability and prevent uneven movement, the box lift incorporates either a spring configuration or elastic member (such as a bungee cord) that serves as a counterbalance to the weight of the box, preventing the mechanism from leaning to one side during operation.

For safety, the box lift includes a hood latch locking mechanism to secure the cargo box in its raised position, ensuring it remains securely in place even in case of actuator failure. Additionally, the mechanism includes guides to ensure proper positioning when the box is raised to its stowed position.

The parallelogram design in various embodiments ensures the cargo box maintains a parallel orientation to the ground throughout the lifting process, making it unlikely that any items placed on top of the box will slide off during operation.

In a box-only lift embodiment, the system functions without the additional rack frame for bicycles or other equipment, focusing solely on providing vertical accessibility to the cargo box itself. This configuration significantly reduces the overall weight of the system while maintaining the core functionality of improved accessibility. In this embodiment, the parallelogram linkage attaches directly to the cargo box's reinforced mounting points, eliminating the need for the separate rack frame structure.

In a simplified embodiment, the invention comprises a box-only lift mechanism that provides vertical accessibility to the cargo box without requiring an additional rack frame structure. This configuration focuses solely on lowering and raising the cargo box itself, making the contents more accessible to users, particularly elderly travelers or those with physical limitations. The parallelogram mechanism in this embodiment attaches directly to reinforced mounting points on the cargo box, eliminating the separate rack frame while maintaining the core functionality of controlled vertical movement.

The box-only lift utilizes the same parallelogram linkage principles as the rack-equipped version, ensuring the cargo box maintains its horizontal orientation throughout the range of motion. When lowered, the entire cargo box becomes accessible at a more convenient height, allowing users to load and unload heavy items such as generators, coolers, or camping equipment without lifting them to the full height of the vehicle's rear door. The linear actuator specifications for this configuration may be adjusted to accommodate the reduced weight requirements, typically utilizing actuators capable of 1000-1200 pounds of force rather than the 1800 pounds specified for the rack-equipped version.

The box-only lift configuration embodiment retains the same mechanical principles as the rack-equipped version, utilizing the parallelogram mechanism to maintain the cargo box in a horizontal orientation throughout its range of motion. This allows users to access the contents of the box at a more convenient height, particularly beneficial for elderly users or those with physical limitations. The box itself becomes the primary storage platform, with its top surface and interior space both accessible when lowered.

For such box-only lift configuration embodiment, the linear actuator specifications may be adjusted to accommodate the reduced weight requirements. A 16-inch linear actuator with a 4-inch stroke capable of exerting approximately 1000 pounds of force would typically be sufficient for a standard cargo box application. The control button remains positioned for easy access, typically mounted on the exterior rear surface of the cargo box.

The box-only configuration embodiment is particularly advantageous for users who primarily transport items that fit within the cargo box itself rather than requiring external mounting. When lowered, the entire cargo box can be accessed at waist height or lower, allowing for easier loading and unloading of heavier items such as generators, coolers, or camping equipment. This eliminates the need to lift such items to the height of the vehicle's rear door.

The safety features of the primary embodiment, including the hood latch locking mechanism and guiding system, remain incorporated in the box-only configuration to ensure secure operation during both transit and usage. Additionally, the counterbalance system using springs or elastic members is maintained to prevent uneven lowering and to assist in raising the box when loaded.

In another embodiment, the invention comprises a box lift mechanism with weight compensation that extends across both rear doors of the recreational vehicle, enabling a full-width lifting solution. This configuration provides substantial advantages over single-door mounted systems by distributing weight more evenly across both rear doors while maintaining the core functionality of the parallelogram lifting mechanism.

In this embodiment, the primary cargo box remains mounted on one rear door of the recreational vehicle, while a complementary support structure is attached to the opposing door. The support structure on the opposing door comprises a mounting plate secured to the door's frame, with reinforced connection points designed to bear significant load. A series of stabilizing arms extend from this mounting plate, configured to engage with corresponding connection points on the primary cargo box's lift mechanism when the doors are closed.

The weight compensation system utilizes a load-transferring linkage that engages automatically when the vehicle's rear doors are closed. This linkage consists of interlocking steel brackets with reinforced pivot points that align precisely when the doors meet. When engaged, this system allows the weight of the cargo and rack assembly to be distributed between both doors rather than placing the entire load on a single door. The connection points utilize self-aligning bushings to accommodate slight variations in door alignment that may occur during normal vehicle operation.

In another embodiment of the weight compensation system configured to engage between the cargo box and the support structure on opposing rear doors, specific mechanical aspects ensure reliable and secure operation. In an exemplary embodiment, the connection mechanism between the two doors comprises precision-machined hardened steel engagement brackets (6061-T6 alloy for optimal strength-to-weight ratio) with tapered leading edges to facilitate self-alignment upon door closure. In an embodiment, each bracket utilizes a primary engagement shaft of 12 mm diameter with a 2 mm thread pitch, manufactured from hardened 4140 steel with a zinc-phosphate coating to resist corrosion while maintaining dimensional stability.

The self-aligning bushing system in an exemplary embodiment employs a dual-cone design with polyoxymethylene (POM) composite bushings featuring PTFE-infused surfaces. These bushings allow for up to 8° of angular misalignment between door-mounted components while maintaining full load-bearing capability. The bushings are retained in precision-reamed sockets (tolerance H7) using spiral retaining rings, allowing for replacement if wear occurs after extended use. The self-centering action is achieved through opposing conical surfaces with a 15° taper angle, creating a natural alignment force as the connection engages.

The load-transferring linkage in an exemplary embodiment comprises a four-bar mechanism fabricated from 38 mm×5 mm wall thickness rectangular 6061-T6 aluminum extrusion for the main structural members, with 8 mm thick stainless steel (AISI 316) reinforcement plates at all stress concentration points and connection interfaces. In an embodiment the pivot points comprise sealed stainless steel ball bearings (6204-2RS specification) rated for 3600 pounds radial load, ensuring smooth operation even under full loading conditions. The linkage dimensional specifications in an embodiment comprise a primary span of 480 mm between pivot centers with secondary members of 320 mm, creating a geometric arrangement that maintains parallel alignment through the full range of motion.

The weight compensation system in an embodiment incorporates a positive-locking mechanism that automatically engages when the doors are closed. This mechanism utilizes a spring-loaded hardened steel locking pin (12 mm diameter) that travels through a bronze guide sleeve and engages with a corresponding hardened steel receiver. The locking pin features a 30° chamfered tip to facilitate engagement even with minor misalignment, while a redundant securing system employs a secondary gravity-actuated latch that falls into position once the primary connection is made. A visual indicator in an exemplary embodiment is visible from the driver's position utilizes an indicator panel that indicates when both primary and secondary locking mechanisms are fully engaged, ensuring the driver can verify secure engagement before travel.

The load transfer capabilities of this system in accordance with an embodiment are achieved through calculated load paths designed to distribute forces evenly between both door mounting points. When fully engaged, the system in an embodiment provides a 40/60 weight distribution split between the two doors, with the primary cargo box door bearing 60% of the load. This distribution in an exemplary embodiment is engineered to match the typical hinge strength capabilities of standard recreational vehicle rear doors, preventing overstressing of any single mounting point. The connection points transfer both vertical and lateral forces, with specific attention to damping torsional loads that may occur during vehicle movement over uneven terrain in accordance with an embodiment.

The weight compensation system in an embodiment incorporates specific mechanical connection points engineered to distribute loads evenly between both rear doors. The primary connection utilizes a precision-machined steel engagement mechanism comprising a male connector mounted on the cargo box assembly and a corresponding female receiver mounted on the opposing door's support structure. The male connector features a tapered leading edge to facilitate self-alignment during door closure, while the female receiver incorporates spring-loaded retention elements that automatically secure the connection.

The self-aligning bushing design in an embodiment employs a dual-cone configuration with polyoxymethylene composite bushings featuring PTFE-infused surfaces. These bushings accommodate up to 8 degrees of angular misalignment between door-mounted components while maintaining full load-bearing capability. The bushings are retained in precision-reamed sockets using spiral retaining rings, allowing for field replacement if wear occurs during extended use.

The load-transferring linkage in an embodiment comprises a four-bar mechanism fabricated from rectangular aluminum extrusion with stainless steel reinforcement plates at stress concentration points. The linkage maintains a 480 mm primary span between pivot centers with secondary members of 320 mm length, creating optimal geometric arrangement for parallel alignment throughout the full range of motion. The connection points transfer both vertical and lateral forces while incorporating damping elements to absorb torsional loads during vehicle movement over uneven terrain.

The full-width configuration provides substantially greater stability by creating a unified platform spanning the entire rear of the vehicle. This platform comprises the primary cargo box on one door connected to the support structure on the opposing door via the weight compensation linkage. When the doors are closed, the system functions as a single integrated unit, distributing forces evenly and reducing stress on individual door hinges and mounting points.

For deployment, the user first activates the parallelogram mechanism via the control button as described in previous embodiments. As the primary lifting mechanism extends, the weight is gradually transferred through both the primary door mounting points and the secondary support structure. The parallelogram linkage maintains the horizontal orientation of the cargo platform throughout its range of motion, as with other embodiments.

The operation of the articulating recreational vehicle rack system in accordance with a preferred method of use follows a specific sequence designed to ensure safe and effective functionality. The user operation sequence begins with preparation and extends through the complete cycle of deployment, use, and stowage.

Prior to initiating the lowering sequence, the user in accordance with a preferred method of use must first ensure the vehicle is parked on reasonably level ground with sufficient clearance (minimum 1.5 meters) behind the vehicle to accommodate the extended rack. The user should then verify that the hood latch locking mechanism is fully disengaged by pulling the release lever until a tactile "click" is felt, confirming complete disengagement. Before pressing the actuation button, the area around and below the intended path of the rack movement should be cleared of all obstacles and bystanders.

The actuation process follows specific timing parameters to ensure smooth operation in accordance with a preferred method of use. When the user presses and holds the actuation button, the control system initiates a 2-second delay during which system diagnostics are performed, verifying power availability and actuator functionality. Following this delay, the linear actuators engage at 25% power for the first 10% of travel, gradually increasing to full power over a 3-second ramp-up period. This progressive engagement prevents jerking or sudden movements that could destabilize items secured to the rack. The typical descent cycle from fully stowed to fully extended position requires approximately 45 seconds at standard operating voltage (12.6V), though this may vary slightly based on load weight and ambient temperature conditions.

Once the rack reaches its fully lowered position, in accordance with a preferred method of use the control system automatically stops the actuators and engages a hold function that maintains position even if the button is released. This allows users to work with both hands free when loading or unloading equipment. The system maintains this hold position by applying minimal power to the actuators at 3-second intervals, compensating for any minor pressure changes or settling that might otherwise cause drift.

When items have been loaded or unloaded and the user wishes to return the rack to its stowed position, in accordance with a preferred method of use they press and hold the actuation button again, which initiates the raising sequence. During raising, the system employs a variable speed profile that slows the actuators to 50% speed when approaching the final 10% of travel, allowing for gentle engagement with the stowed position stops and locking mechanism. The control system monitors current draw during the final approach to detect when the rack has fully seated against the stops, automatically cutting power once proper seating is achieved.

The full-width configuration particularly excels when used as a bike rack, as it provides sufficient structural support for carrying multiple bicycles (typically up to four) compared to the two-bicycle limitation of the single-door configuration. The weight compensation system ensures that even with multiple bicycles loaded, the stress is appropriately distributed between both rear doors, preventing excessive strain on any single hinge or mounting point.

This embodiment incorporates linear actuators with higher load capacity than the standard configuration-typically utilizing dual 16-inch actuators with 6-inch stroke, each capable of exerting 2200 pounds of force. These more powerful actuators accommodate the increased weight capacity of the full-width system, which can support loads up to 500 pounds when properly balanced.

The dual linear actuator configuration in accordance with an embodiment provides precise control and substantial lifting power for the full-width system that spans both rear doors. Each linear actuator in an exemplary embodiment is capable of exerting at least 2000 pounds of force, distinguishable from the 1800 pounds specified in the single-door configuration in an embodiment, to accommodate the increased weight capacity and leverage requirements of the expanded system.

Heat dissipation during continuous or repeated operation is addressed through multiple design elements in accordance with various embodiments. Each actuator incorporates aluminum heat sink fins on the motor housing, increasing surface area for passive cooling. The actuator housing is thermally isolated from the mounting brackets using fiber-reinforced polymer spacers that prevent heat transfer to the surrounding structure. For extended operation scenarios, the control system includes a thermal monitoring circuit that will temporarily reduce power to prevent overheating if internal temperatures exceed 85° C. This adaptive power management ensures the actuators can function reliably even in high-ambient temperature environments or during repetitive cycling operations.

The interconnection between the two door-mounted components includes a precision-engineered latching mechanism that engages automatically when the doors are closed. This latch comprises hardened steel components with self-lubricating bushings to ensure smooth operation and resistance to wear. The latching mechanism is designed with a tapered engagement profile that guides the components into proper alignment even when the doors are closed with minor misalignment.

For safety, this embodiment incorporates additional locking mechanisms beyond those in the standard configuration. These include redundant mechanical locks that secure the weight compensation linkage in its engaged position during vehicle operation, preventing unintended disconnection of the cross-door support even in rough driving conditions. A visual indicator visible from the driver's rearview position confirms proper engagement of the weight compensation system.

The full-width embodiment's support frame includes standardized mounting rails compatible with common bicycle carrier systems, allowing users to easily attach and secure multiple bicycles. The frame incorporates adjustable wheel trays and securing points that accommodate various bicycle styles and sizes, from children's bikes to full-suspension mountain bikes and road bicycles.

When used as a bike rack, the system's parallelogram mechanism provides the same accessibility benefits as other embodiments, allowing users to lower the entire rack to a comfortable loading height rather than lifting bicycles to the vehicle's full height. This feature is particularly valuable when multiple heavy bicycles need to be loaded and unloaded.

The rack is adjustable to various configurations of cargo box 110 configurations in various embodiments, allowing it to be adapted to fit boxes of different widths, depths and heights. This flexibility ensures that the system can be installed on a variety of RV models, from compact van conversions to larger motorhomes, thus broadening its appeal and usability across the RV market. Furthermore, the interchangeability of the rack component significantly enhances the system's versatility. The rack can be easily utilized with mounts designed for other items such as generators, extra fuel containers, or water tanks. This feature allows users to customize their storage solution based on their specific needs for each trip. For example, an RV owner planning a long-distance trip might replace the bike rack with a mount for an extra fuel container. Alternatively, for a camping trip in a remote area, they could swap it for a mount to carry additional water tanks. This adaptability extends to other potential accessories as well, such as mounts for firewood or a portable generator The invention in an embodiment further comprises a cargo box 110 of particular configurations, such that the rack frame 120, the arms 140, the linear actuator 150 and the cargo box 110 are packaged as a unified accessory system for a recreational vehicle 200. In an exemplary configuration, the cargo box 110 is a typical cargo box as available for installation upon a recreational vehicle with minimal modification.

An embodiment of the invention comprises a cargo box 110 transformed into a "smart box" by integrating various power-dependent features and modular accessories. This concept expands the functionality of the storage system beyond simple cargo transportation, turning it into a versatile hub for outdoor activities and camping in one example. In an exemplary embodiment, the smart cargo box's electrical components, including the mobile power station, are connected to the vehicle's power supply via an external wire that connects to the trailer hitch power supply. This connection serves as the primary power source for the smart cargo box's various electrical features. The trailer hitch electrical hookup typically provides a 15 Amp 12V power supply, with some vehicles offering up to 30 Amp 12V service for trailer use. This power source can be utilized to operate the smart cargo box's electrical systems and in various examples to charge its built-in battery. The mobile power station within the smart cargo box in an embodiment is designed with multiple power outlets and USB ports to accommodate various devices and small appliances. Its built-in battery system allows for power storage and distribution even when the vehicle's engine is off. To ensure continuous operation, the power station's battery is charged while the vehicle is running, utilizing the power supplied through the trailer hitch connection.

To manage power distribution efficiently, the smart cargo box in an embodiment incorporates a power management system. This system would regulate the charging of the built-in battery when the vehicle is running and control power distribution to the various electrical components and outlets when in use. Additionally, the system in embodiments includes safety features such as overload protection and low-voltage cutoff to prevent battery depletion. The external wire connecting the smart cargo box to the trailer hitch power supply in an embodiment is appropriately rated to handle the maximum current draw of the system. In an embodiment, the external wire would also require proper weatherproofing and strain relief to ensure durability and safety in various driving conditions as is well understood in the art.

The smart cargo box configuration in an embodiment incorporates multiple powered accessories that transform the storage system into a comprehensive outdoor activity hub. The electrical system is designed around a 15-amp 12V power supply derived from the trailer hitch electrical connection, with some vehicle configurations supporting up to 30-amp 12V service for enhanced capability. A supplementary battery system within the cargo box provides power storage and distribution when the vehicle engine is off, with the battery automatically charging during vehicle operation.

Specific smart box modules in an embodiment include an integrated air compressor system capable of inflating tires, air mattresses, and other equipment directly from the cargo box. The air compressor operates on 12V power and includes pressure regulation and automatic shutoff features. A built-in cooler system comprises a slide-out refrigerated compartment powered by the electrical system, providing additional food and beverage storage capacity. The mobile power station includes multiple 12V outlets, USB ports, and AC inverter capability for powering small appliances and charging electronic devices.

The auxiliary lighting system in an embodiment serves dual purposes, incorporating both camping illumination and vehicle safety lighting. LED strips mounted on the exterior of the box provide area lighting for nighttime activities, while integrated brake, turn, and reverse signal lights enhance vehicle visibility and safety. The lighting system connects to the vehicle's existing electrical system and operates in synchronization with the primary vehicle lights to ensure regulatory compliance.

In an exemplary embodiment, the smart cargo box configuration comprises an integrated air compressor system. This feature allows RV owners to easily inflate tires, air mattresses, or other inflatable equipment directly from the cargo box 110. The air compressor in an embodiment is powered through the trailer hitch electrical hookup further linked to a battery supply within the smart cargo box, ensuring that it is always ready for use without draining the vehicle's main battery.

Another exemplary embodiment of the smart cargo box comprises a built-in cooler system. In an example, the built-in cooler system comprises a slide-out compartment within the cargo box 110, powered by the vehicle's electrical system or a supplementary battery contained within or attached externally to the cargo box 110. Such aspect provides RV travelers with additional refrigeration space for food and beverages, especially useful for extended trips or when camping in remote areas.

In an exemplary embodiment, the smart cargo box comprises a mobile power station. In an example, the mobile power station comprises multiple power outlets and USB ports, allowing users to charge various devices or power small appliances. The power station in an example comprises a battery that is charged while the vehicle is running and provide power even when the engine is off, thanks to a built-in battery system.

In an exemplary embodiment, the smart cargo box as an integrated part of the system comprises aspects to facilitate auxiliary lighting that serve multiple purposes. The smart cargo box in an exemplary embodiment is connected to LED strips or spotlights mounted on the exterior of the box or upon aspects of the rack, providing additional illumination for nighttime activities or improved visibility when setting up camp. These lights in various embodiments are controlled via a switch on the box itself, from within the recreational vehicle, or through a smartphone app for added convenience via mechanisms well understood in the art. Additionally, the lighting system in an embodiment incorporates braking, turning, and reverse signal lights to enhance the visibility of the vehicle during operation, especially at night. This feature addresses a common issue with many RV boxes and bike rack solutions that can limit rear nighttime visibility to other vehicles. By integrating these essential vehicle lights into the smart cargo box system, an embodiment of the invention improves overall safety for the RV and surrounding traffic. The braking, turning, and reverse lights in an embodiment are connected to the vehicle's existing electrical system and operate in sync with the vehicle's primary lights, ensuring compliance with road safety regulations. The combination of auxiliary lighting for camping purposes and integrated vehicle signaling lights in accordance with an embodiment makes the smart cargo box a multifunctional solution that enhances both user convenience and road safety. This dual-purpose lighting system not only improves the RV experience for users but also addresses potential safety concerns associated with reduced visibility due to rear-mounted storage solutions.

In an exemplary embodiment, the smart cargo box comprises a compact camp kitchen module. In an embodiment, the compact camp kitchen module comprises a fold-out countertop surface, a small sink with a water tank, and an induction cooktop. The induction cooktop in an example is particularly suitable for applications associated with embodiments of the invention due to its energy efficiency and safety features. This kitchen module is powered in various embodiments directly through the trailer hitch electrical hookup or via a dedicated battery system integrated into the cargo box 110, that charges while the vehicle is operating via wire connected to the trailer hitch power supply.

To enable these various powered features, the smart cargo box in an embodiment a central control unit. In an exemplary embodiment, the central control unit comprises a simple interface mounted on the box itself, allowing users to control and monitor the different modules. Alternatively, it could be designed as a more advanced system with wireless connectivity, enabling control via a smartphone app as is well understood in the art.

In various aspects, the modular nature of the aforementioned accessories of the smart cargo box is a teaching of the invention. In various examples, users could potentially customize their box by selecting and installing only the features they need for a particular trip. In an exemplary embodiment, this is achieved through a system of standardized connections and mounting points within the cargo box 110, allowing for easy installation and removal of different modules. In another aspect, the smart cargo box comprises a power management feature. In accordance with such power management feature, the trailer hitch electrical hookup provides a primary power source, while the inclusion of a supplementary battery system into the smart cargo box greatly enhances the smart cargo box's functionality. This battery could be charged while the vehicle is running and provide power to the various accessories when the engine is off or when the vehicle is disconnected from external power sources.

This level of customization and adaptability sets this rack system apart from traditional, fixed-purpose storage solutions. It allows RV owners to maximize the utility of their limited exterior storage space, adapting it to meet their changing needs across different trips and activities. By providing this flexibility, the invention addresses a common frustration among RV enthusiasts who often struggle with the limitations of standard storage options, thereby enhancing the overall RV experience.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

I claim:

1. A storage and transportation system for a recreational vehicle, comprising:
- a cargo box configured to be mounted on a rear door of the recreational vehicle;
- a parallelogram mechanism connected to the cargo box, the parallelogram mechanism comprising a plurality of arms; and
- at least one actuator configured to control movement of the parallelogram mechanism, wherein the parallelogram mechanism is configured to lower the cargo box from a stowed position to an extended position while maintaining the cargo box substantially parallel to the ground;
- a rack frame attached to the cargo box via the parallelogram mechanism, wherein the parallelogram mechanism is configured to lower the rack frame while maintaining the rack frame substantially parallel to a top surface of the cargo box;
- wherein the rack frame is configured to rest on a tire mounted on an opposing rear door of the recreational vehicle when in the stowed position.

2. The system of claim 1, further comprising a guiding mechanism comprising a protrusion and a corresponding receptacle configured to align the cargo box as it is raised to the stowed position.

3. A storage and transportation system for a recreational vehicle having first and second rear doors, comprising:
- a cargo box mounted on the first rear door of the recreational vehicle;
- a support structure mounted on the second rear door of the recreational vehicle;
- a weight compensation system configured to engage between the cargo box and the support structure when the first and second rear doors are closed, thereby distributing weight between both doors; and
- a parallelogram mechanism connected to the cargo box, the parallelogram mechanism configured to lower the cargo box from a stowed position to an extended position while maintaining the cargo box substantially parallel to the ground;
- wherein the weight compensation system comprises precision-machined steel engagement mechanisms comprising a male connector mounted on the cargo box assembly and a corresponding female receiver mounted on the support structure.

4. The system of claim 3, further comprising dual linear actuators, each capable of exerting at least 2000 pounds of force to accommodate the increased weight capacity of the full-width system.

5. The system of claim 3, further comprising a visual indicator visible from a driver's position to confirm proper engagement of the weight compensation system.

6. A method for operating a storage and transportation system on a recreational vehicle, comprising:
- mounting a cargo box on a rear door of the recreational vehicle;
- connecting a parallelogram mechanism to the cargo box;
- actuating the parallelogram mechanism to lower the cargo box from a stowed position to an extended position while maintaining the cargo box substantially parallel to the ground;
- accessing contents of the cargo box at the extended position; and
- attaching a rack frame to the cargo box via the parallelogram mechanism and securing equipment to the rack frame when the rack frame is in the extended position.

7. A box lift system for a recreational vehicle, comprising:
- a cargo box configured to be mounted on a rear door of the recreational vehicle;
- a parallelogram linkage system connected to the cargo box;
- at least one gas strut configured to compensate for approximately 300 pounds of weight with a slight positive bias to assist in raising the cargo box while maintaining position when fully lowered;
- a hood latch locking mechanism to secure the cargo box in a raised position,
- wherein the parallelogram linkage system is configured to maintain the cargo box in a horizontal orientation throughout its range of motion the gas struts comprise nitrogen filled cylinders with pressure ratings between 150-200 PSI at ambient temperature and incorporate a progressive damping mechanism.

8. The system of claim 1, further comprising a smart cargo box configuration incorporating multiple powered accessories including an integrated air compressor system, a slide-out refrigerated compartment, and an auxiliary lighting system with LED strips and integrated vehicle signaling lights.

9. The system of claim 8, wherein the electrical system is designed around a 15-amp 12V power supply derived from a trailer hitch electrical connection with a supplementary battery system within the cargo box.

10. The system of claim 1, wherein the parallelogram mechanism arms are constructed from steel and the cargo box attachment utilizes ⅜-inch bolts on bushings with a steel reinforcement plate installed inside the cargo box.

11. The system of claim 10, wherein a rack frame is constructed from aluminum to minimize overall weight while providing adequate strength for equipment mounting, and mounting hardware utilizes marine-grade stainless steel fasteners.

* * * * *